Nov. 12, 1968 D. M. TURNBULL 3,410,611
LOAD-RESPONSIVE FLUID-PRESSURE CONTROL MEANS
Filed Dec. 29, 1966
2 Sheets-Sheet 1
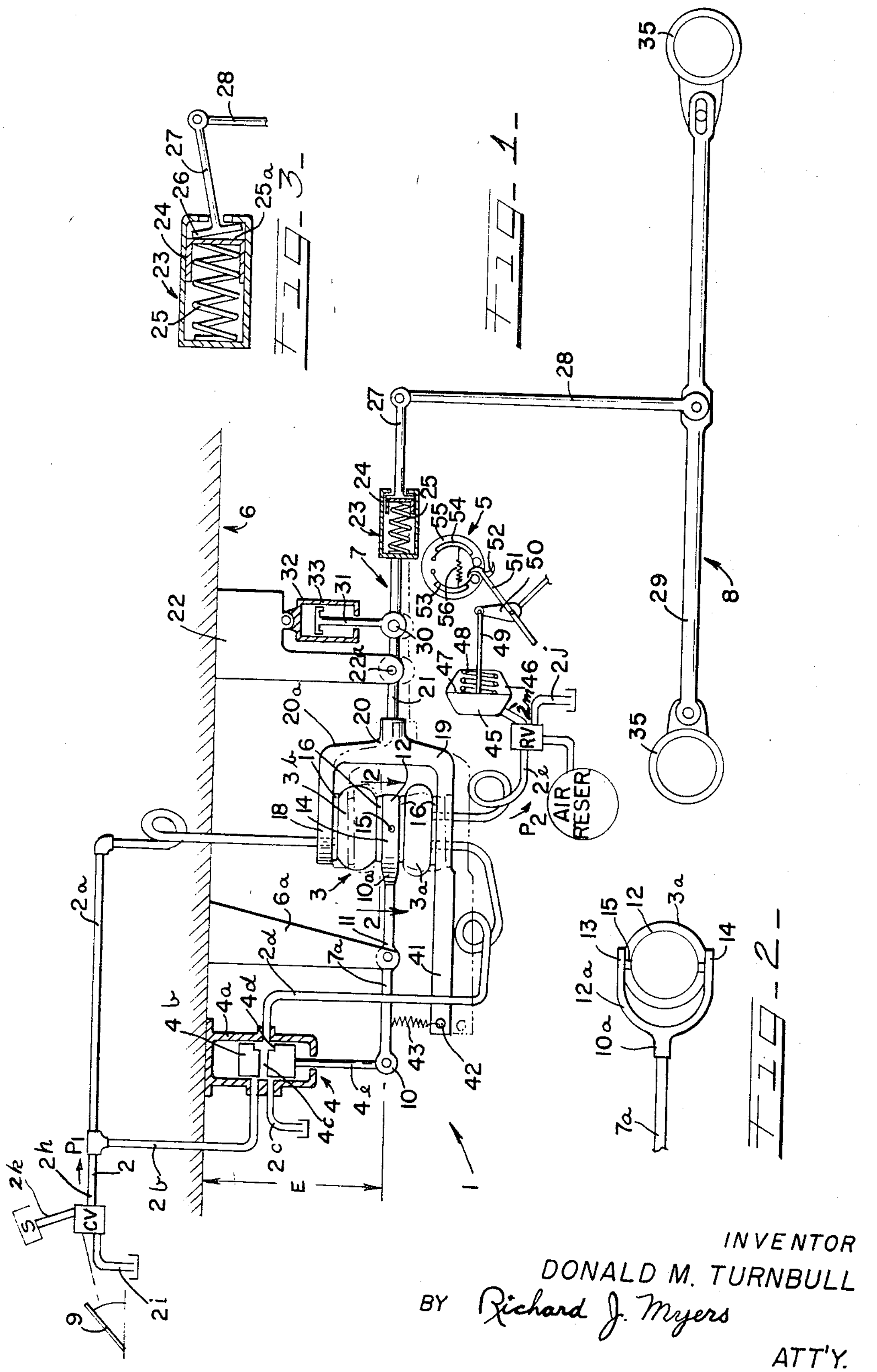
INVENTOR
DONALD M. TURNBULL
BY Richard J. Myers
ATT'Y.

BRAKING EFFORT (lbs.)

INVENTOR
DONALD M. TURNBULL

BY Richard J. Myers
ATT'Y.

United States Patent Office 3,410,611

Patented Nov. 12, 1968

1

3,410,611
LOAD-RESPONSIVE FLUID-PRESSURE CONTROL MEANS

Donald M. Turnbull, Cincinnati, Ohio, assignor to Pullman Incorporated, Chicago, Ill., a corporation of Delaware Filed Dec. 29, 1966, Ser. No. 605,885
29 Claims. (Cl. 303—22)

ABSTRACT OF THE DISCLOSURE

A vehicle braking system comprising a leveling valve having access for a source of fluid pressure and fluid bleed means and adapted for connection with the vehicle body, a pair of interconnected flexible air bags, a first lever adapted to be fulcrumed on the vehicle and connecting with the leveling valve and with each air bag and intermediate each air bag, a second lever adapted to be fulcrumed on the vehicle and operatively connecting with the outer portion of each air bag and adapted to connect with the vehicle load supporting means, said leveling valve means having communication with one air bag having a fluid pressure exit and the other air bag having an access to the source of fluid pressure.

This invention relates to fluid pressure modulating means such as a fluid pressure brake control means for vehicles or the like that is responsive to change in carrying loads and in particular relates to a load modulated brake control means in which less fluid pressure is delivered to the brake means under lighter loads than under heavier loads.

In such vehicles as trailers there is a high loaded to light weight ratio such that the trailer brakes capable of stopping a full loaded unit are too powerful when the unit is empty and very light foot pressure on the brake pedal is all that is needed to skid the wheels under light-loaded conditions. In a skid there is a danger of loss of control of the vehicle and the stopping distance of the vehicle is actually more than if the wheels are braked only up close to, but not beyond the point of skidding. Hence there is an increased interest throughout the industry in a load modulated brake system in which the same foot pressure on the brake pedal results in less air pressure being delivered to the brakes when the trailer is empty than it does when loaded. One approach has been to provide an air pressure proportioning valve means attached to the trailer frame and connected through linkage to the axle. When payload is added to the trailer, the springs deflect and this movement signals the proportioning valve means to transmit a larger percentage of input pressure to the brakes. Eventually when the springs are fully deflected, the proportioning valve means reaches a 1 to 1 ratio and the full input pressure is applied to the brakes. The proportioning valve means may comprise a mechanical type fixed diameter piston balancing means operated by adjusting linkage. Such type of proportioning valve means can be more subject to wear and are complicated and are more likely to change adjustment due to wear. The arrangement proposed by this invention is less subject to wear, has fewer components and is less likely to change adjustment due to wear. The invention comprehends the use of flexible fluid receiving means or bags responsive to changes in vehicle load for proportioning the amount of fluid pressure delivered to the brakes in accordance with the load of the vehicle.

2

It is therefore a general object of this invention to provide fluid pressure modulating means responsive to changes in loads, that is, means for developing light fluid pressure under light loads and heavy or high fluid pressure under greater loads whereby the means for supplying the fluid pressure requires only generally a constant pressure source. Such an arrangement is applicable to control braking of a vehicle whether under heavy or light loads and therefore prevents skidding of the vehicle under light loads. Such an arrangement may also be used in a hoist or winch device or in an elevator brake, etc.

Another object of this invention is to provide a variable fluid pressure or air pressure proportional to the load but where the operator need only apply the same amount of effort irrespective of the load and wherein there is provided a pair of fluid pressurized bags or containers for proportioning the effective fluid pressure in accordance with the variation in the load and whereby the pressure required to operate an actuating mechanism to supply the fluid pressure is relatively constant with respect to the load variations.

Another object of this invention is to provide for a vehicle braking means which has a load responsive fluid pressure control means operative to brake the vehicle irrespective of the vehicle load whereby the brake pedal feel is somewhat constant irrespective of the variation in the vehicle load.

A further object of this invention is to provide for a resilient means such as a compression of spring to overcome the spring pressure in the brake chambers of the vehicle so that minimal pressures such as 5 p.s.i. are not proportioned down or affected by the proportioning valve.

The further object of this invention is to provide for a proportioning valve for an air pressure brake system, as discussed above, wherein there is provided a load shock dampening means for dampening out high frequency vibration and where there may further be provided a flexible connection between the vehicle frame and the vehicle wheels to permit movement of the axle without damage to the braking mechanism.

A still further object of this invention is to provide for a load responsive fluid brake control means for a vehicle having air brakes whereby a leveling valve is connected to the air pressure line and then to an air bag or container and whereby the air pressure line is also connected to an air bag above the first mentioned air bag and whereby there is an air pressure line leading from the first mentioned bag to the air brakes and whereby the vehicle frame operates linkage connected to each air bag and to the vehicle wheels and whereby such linkage also operates the leveling valve so as to maintain an equilibrium position of the linkage with respect to the leveling valve and the vehicle frame.

It is another object of this invention to provide for a load responsive fluid pressure proportionalizing means comprising a pair of pressurized fluid containing bags in opposition to one another to achieve control of an output fluid pressure relative to the input fluid pressure in response to changes in load.

These and other objects will become more apparent when referring to the following description, drawings and appended claims wherein:

FIG. 1 is a general elevational view of the invention;

FIG. 2 is a partial plan view taken along line 2—2 of FIG. 1;

FIG. 3 is an enlarged partial view illustrating the flexible connection between the load and the brake control means;

Figure 6:
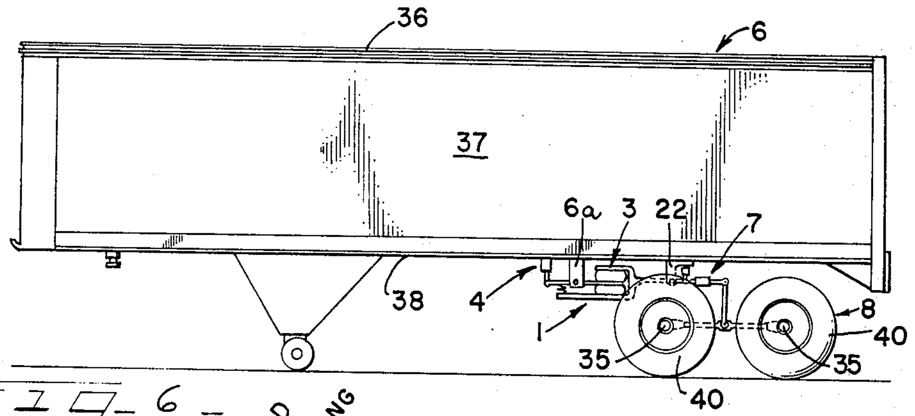
FIG. 6 illustrates the embodiment of the invention in a trailer vehicle.

With reference now to the drawings and in particular with reference to FIG. 1, there is shown a load responsive fluid pressure control means 1 which comprises an input pressurized fluid or air line or conduit means 2 which supplies the pressurized fluid or air to the top of a flexible pressurized fluid containing means or containers or bag means 3 and to a conventional leveling type valve 4 which is in fluid communication with the lower part or bag 3*a* of the flexible fluid containing means and the fluid pressure responsive reaction means 5, such as vehicle braking means, responsive to variation in the weight of the load means 6 such as a trailer body, provided with suitable linkage 7 connecting the load means 6 with the air bag means 3 and with the leveling valve means 4, said linkage 7 being connected with and reacting against the load supporting means 8, such as the trailer supporting ground engaging members or wheels.

The pressurized air line comprises a conduit 2*a* communicating with the interior of the top air bag 3*b* for introducing air under pressure therein and a pressurized air line 2*b* introducing air to the conventional leveling valve means 4 which comprises a cylinder 4*a* having reciprocably disposed therein a piston 4*b* provided with a bore or port 4*c* wider at its right end than at its left end and communicative with line 2*b* and with exhaust line 2*c* communicative with the atmosphere or a low pressure source, the widened opening 4*d* of the port 4*c* being in communication with the exiting air pressure line 2*d* communicating with the lower air bag 3*a* for supplying air under pressure to the bag 3*a* or exhausting air under pressure therefrom to the brake means 5 by way of air pressure line 2*e* of the air conduit means 2. The entrant portion 2*k* of the air line 2 is in communication with a conventional air compressor or source of pressurized air S, say under a constant 100 p.s.i. The air pressure in the air line 2*h* is governed by the driver's foot pedal or other operating means 9 whereby as greater braking effort is desired for a given load, depression of the brake pedal operates the control valve CV which has exhaust line 2*i* and delivers in a conventional way increased air pressure (which may vary from, say, 0 p.s.i. to 100 p.s.i., depending upon the foot pedal pressure) to line 2*h* hence to lines 2*a* and 2*b* and to valve means 4 to the air pressure proportionalizing means 3 which consists of the flexible air containers 3*a* and 3*b*, the air pressure in line 2*d* being varied between, say, 5 p.s.i. and 100 p.s.i. by proportionalizing bag means 3. The fluid pressure signal initiated by the operator depressing pedal 9, is applied to the one air bag 3*b* of the two air bags directly and to the other air bag 3*a* by way of the leveling valve 4 such that the pressure in the second flexible air bag 3*a* is transmitted to conventional relay valve RV which, in a conventional manner, allows the air pressure, from source AIR RESER. subject to the proportionalizing means 3, in line 2*e* to either go into line 2*m* to housing 47 or exhaust line 2*j* for varying the amount of application of the vehicle brakes in accordance with movement of the pedal 9. The relay valve RV is a spring loaded valve in which the air pressure in the air under pressure in the reservoir AIR RESER. acting on the conventional piston of the conventional valve RV balances the input or signal pressure (air line pressure) in line 2*e* from the control valve CV. The relay valve RV is capable only of delivering to the brake chambers the same pressure that it receives as a signal from the brake pedal. A conventional emergency line keeps the air reservoir AIR RESER. at full compressor pressure as in any trailer brake system.

The linkage 7 connecting the leveling valve means 4 with the load 6 and the load supporting means or trailer axle means 8 connects with a rod 4*e* of the leveling valve means 4 extending outwardly of the cylinder 4*a* and is connected to the piston 4*b*. The rod 4*e* is pivotally connected to one end 10 of the lever 7*a* of linkage 7 and the lever 7*a* has its central portion 11 pivotally mounted on a support arm or hanger 6*a* depending from the load means 6. The other end portion 10*a* of link 7*a* is formed into a U-shaped portion 12A pivotally carrying divider plate 12 as seen in plan in FIG. 2 with a pair of arms 13 and 14 pivotally carrying the air bag means intermediate their ends by pivot 15. The flexible air bag means comprising the upper bag 3*a* and the lower bag 3*b* is such that each bag is identical to the other and each bag is provided with a tubular flexible wall 16*a* and a pair of vertically spaced flat rigid discs 16 at their respective upper and lower surfaces which the inner discs 16 thereof of each bag are connected to the plate 12, the outer discs 16 of each air bag 3*a* and 3*b* being fixed to the outer ends or legs 18 and 19 of U-shaped portion 20*a* of yoke or lever 20 of the linkage 7, the yoke 20 having an extension arm 21 pivotally mounted on a second depending support arm or hanger 22 attached to the load or body 6, such pivotal connection being indicated at 22*a*. The right end of the pivot arm 21 is provided with a flexible connection means 23, and as best seen in FIG. 3, comprises a housing 24 containing a compression spring 25, the right end of which receives cup 25*a* which abuts plate 26 of rod 27 pivotally connected to depending link or load indicating rod 28 pivotally connected to the linkage bar 29 of the member 8. The hanger 22 pivotally depends the dash pot means which is a silicone oil dash pot 33 comprising a cylinder 32 and a piston element 31 reciprocably disposed therein and pivotally connected at 30 to the arm 21. The outer ends of the slotted linkage bar 29 carry the vehicle axles 35.

With reference now to FIG. 6 it is seen that the load responsive fluid pressurizing means finds embodiment in a trailer unit 36 which comprises a trailer body 37 including an underframe 38 from which depend the hangers 6*a* and 22 and the leveling valve 4 and the linkage 7 which supports the air bags 3*a* and 3*b*, all being supported by the axles 35, 35 carrying the wheels 40, through conventional semi-elliptical springs (not shown).

As seen in FIG. 1, the lower arm 19 of the portion 20*a* extends outwardly and has at its outer end 41 a spring receiving aperture 42 which receives a compression spring 43 connected to the arm 7*a* intermediate its outer pivotal connection 10 with the rod 4*e* and its pivotal connection 11 with the arm or hanger 6*a*.

It is seen in FIG. 1 that the air line 2*e* exiting from the lower bag 3*a* enters valve RV and from valve RV line 2*m* enters the chamber 45 of the housing 46 allowing the air pressure to act against diaphragm 47 within the housing 46 to urge the spring 48 to the right, the diaphragm 47 being connected to a link 49 extending outwardly of the housing 46. The outer end of the arm 49 forms a crank 50 to rotate rod 51 to operate the cam end 52 of the rod 51 (shown in perspective) for expanding the brake shoes 53, 54 against the drum 55 of the wheels 40 of the trailer 36. When the supply of air under pressure falls off or ceases, the spring 48 will return the linkage to its neutral position whereby the formerly expanded brake shoes 53, 54 are then brought back to their unbraked position. A brake shoe spring 56 interconnects each brake shoe 53, 54 to keep them out of contact with the drum 55 when the brakes are not applied and the brake return spring 48 rotates cam shaft 51 to off position upon release of air pressure to terminate braking action.

Figure 4:
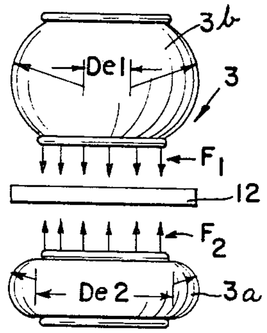
FIG. 4 is illustrative of the pressurized fluid containing means or bags.

The purpose of this invention is to proportionalize down the air pressure supplied to the brakes of the vehicle when the vehicle is carrying light loads relative to when the vehicle is carrying a heavy load and this is accomplished by the two identical air bag means 3*a*, 3*b* between the flat steel discs 16, the air bag means being made out of fabric-reinforced rubber sides or the like, such that, when extended, each bag looks like a cylinder and when compressed each looks like a doughnut. The effective cross-sectional areas A ($A_1$ for bag 3*b* and $A_2$ for bag 3*a*) of each bag means varies with the expansion of the air bags and when fully extended each bag will support little or no load on its ends, regardless of internal pressure, so that the effective area of the bag is nearly zero. When partially compressed, large loads can be supported on the upper and lower ends of each bag with relatively small internal pressures. Thus the "effective" area is large. Generally speaking, the effective diameter of the air bag is the distance between the center points of the radius describing the curvature of the side walls of the bag. With reference to FIG. 4 it is seen that there is shown an upper bag 3*b* and a lower bag 3*a* and the plate 12 extending therebetween. The upper bag 3*b* has an effective diameter $De_1$ and the lower bag 3*a* has an effective diameter $De_2$. The upper bag 3*b* exerts a force $F_1$ on the divider plate and the lower bag 3*a* exerts a force $F_2$ on the divider plate 12. This is the condition shown in FIG. 1 where there is only a light load exerted by the trailer body and contents on the supporting wheels, whereas in FIG. 5 where both bags 3*a* and 3*b* have generally the same effective diameter the vehicle load is much heavier. Now $\text{Force}_1$ must equal $\text{Force}_2$ as there exists a balance condition between the yoke 20 and the link 7*a*, where $P_1$ equals input pressure and $P_2$ equals output pressure (see FIG. 1). Where the pressure is equal to P and the force is equal to F, we have the following formulation:

Where $\pi$=approximately 3.1416:

$$F_1=\frac{\pi}{4}(De_1)^2\times P_1,\text{ where }\frac{\pi}{4}(De_1)^2=A_1$$

$$F_2=\frac{\pi}{4}(De_2)^2\times P_2,\text{ where }\frac{\pi}{4}(De_2)^2=A_2$$

$$\text{If }F_1=F_2\text{ then }P_1(De_1)^2=P_2(De_2)^2$$

$$\text{or }\frac{P_1}{P_2}=\frac{(De_2)^2}{(De_1)^2}$$

Figure 5:
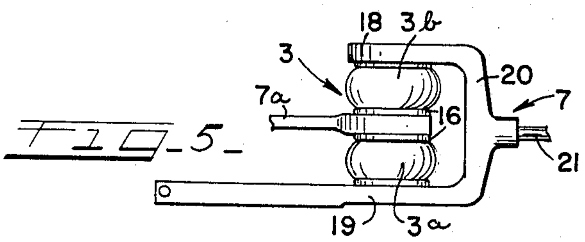
FIG. 5 is illustrative of the heavy loaded position of the pressurized fluid containers.

In the arrangement shown in FIG. 1, any forces which tend to lower the spool valve 4*b* of the leveling valve means 4 will result in air being exhausted from the lower bag 3*a* of the two air bags which will return the spool 4*b* to its normal position. Any forces tending to raise the spool will result in input air being fed to the lower bag 3*a*, forcing the spool, through the mechanical linkage 7*a*, down again. Thus the spool 4*b* and hence the divider plate 12 of member 7*a* between the bags 3*a* and 3*b*, always tend to seek a fixed position or equilibrium position with respect to the trailer frame 38. In the position shown in FIG. 1, the pressure times the effective area ($P_1A_1$ and $P_2A_2$) of the two bags must be equal. In the top bag 3*b*, we have input pressure and a relatively small effective area, and since the effective area of the lower bag is relatively large, the pressure in it must be relatively low. If we move the yoke portion 20*a* downward from the position shown in FIG. 1, a motion which would result from an increased load on the trailer, the divider plate 12, wanting to stay in the same position, would cause the two bags 3*a* and 3*b* to reach an equilibrium point at which the upper bag 3*b* is more compressed and the lower bag 3*a* more extended than shown in solid line but rather as shown in the dotted line where you have the heaviest loaded condition, and as shown in FIG. 5. This would bring the relative areas of the two bags 3*a* and 3*b*, and hence the pressures, more nearly equal. Further lowering of the yoke 20 would eventually result in the two areas ($A_1$ and $A_2$), and hence the pressure ($P_1$ and $P_2$), being equal. At this point and at any point beyond this, full line pressure is applied to the brakes.

In operation, when the load increases, the trailer frame 38 lowers, moving closer to the axles 35, and the yoke lever 20 pivots counterclockwise while lever 7*a* pivots clockwise, carrying the leveling valve rod 4*e* up to raise the spoool beyond its normal equilibrium position (see FIG. 1), resulting in input air being fed to the lower bag by way of port 4*c* to return the divider plate 12 and therefore lever 7*a* to the neutral position, a distance E from the trailer frame 38, resulting in a condition where the lower bag 3*a* is relatively more compressed and the upper bag 3*b* is relatively more flattened.

Thus, as can be seen, the two air bags 3*a* and 3*b* are in opposition to each other to achieve a controllled output air pressure to the brake chamber 45 when the line pressure is delivered by operation of the brake pedal 9 operating the pressure-regulating valve CV to supply a certain input pressure into the leveling valve 4 and the upper bag 3*b*, the effective areas ($A_1$ and $A_2$) of each of the bags being controlled by the positioning of the load relative to the vehicle, the deflection of which load operates the connecting link means 20, 7*a* to operate the leveling valve 4 to establish the ratio of the effective areas of each bag and, in effect, at light loads proportionalizes the air pressure down applied to the brakes and at greater loads increases the air pressure to the brakes so that the operator, regardless of whether the vehicle is heavy-loaded or light-loaded, has the same feel when he applies his foot to the brake pedal and, therefore, the line pressure can be such to be effective for operating heavy-loaded vehicles and yet be proportionalized down to operate the vehicle when the load is light so that the operator will not presss the brakes too hard under light-loaded conditions and place the vehicle into a dangerous skid condition. That is, the same foot pressure is produced under heavy-loaded conditions as under light-loaded conditions and, therefore, the proportioning valve modulates or sensitizes the feel of the brake pedal for the operator. It will also be appreciated that such a load-responsive fluid pressure control means may be used in many other types of devices such as in hoists or winches or elevator brakes, etc., that is, wherever pneumatic or hydraulic sensitive control by the operator is required.

It will also be appreciated that the resilient connection or lost motion device 23 permits excessive travel without damage to the mechanism. The conventional leveling valve 4 is such as is commonly used in air ride suspensions for trailers. The effective area of the air bags varies with extension. The sensitivity of operation may be controlled by the lengths of the lever arms 7*a* and 21. The dash pot 33 compensates for rapid changes between the frame 38 and the axle 35, that is, prevents rapid motion of the yoke 20 and operates in conjunction with the lost motion device 23 which permits movement of rod 28 and the axle without damage to the yoke when it is prevented from moving.

The function of the bias spring 43 is as follows. To appreciate it, it must be understood that a certain minimum pressure, say 5 pounds per square inch (p.s.i.), is necessary to compress the return spring 48 in the brake chamber 45, and a driver is used to feeling the brakes begin to take hold after depressing his foot pedal to a certain point which delivers this 4 p.s.i. to the brakes. However, the proportioning valve operates in such a way that at very light loads (when the air bag ratio may be as high as 5 to 1, that is only ⅕ of the available line pressure is being delivered to the brake chambers as is the case under the light-loaded condition) the driver must press five times as hard on the foot pedal before he feels the brakes beginning to take hold. The bias spring 43 is fully extended when the trailer is loaded, and it has no effect whatever. However, at lighter loads it begins to put a slight pressure on the leveling valve spool 4*b*, which allows slightly higher pressures to build up in the lower bag 3*a*. The strength of the bias spring is such that at the lightest load, it allows just 5 p.s.i. more pressure to build up in the lower bag than would be the case without it. With no input air pressure at all, this bias spring holds the spool of the leveling valve in the "up" position, connecting the input air line to the lower bag 3*a*. When the driver applies the first 5 p.s.i. of foot pedal pressure, this goes directly to the brakes and is not proportioned down. Any pressure in excess of the 5 p.s.i., however, results in an input pressure to the brakes equal to 5 p.s.i., plus area 1 over area 2×the input pressure $P_1$ (i.e., $$5\ \text{p.s.i.}+A_1/A_2\times P_1)$$

Figure 7:
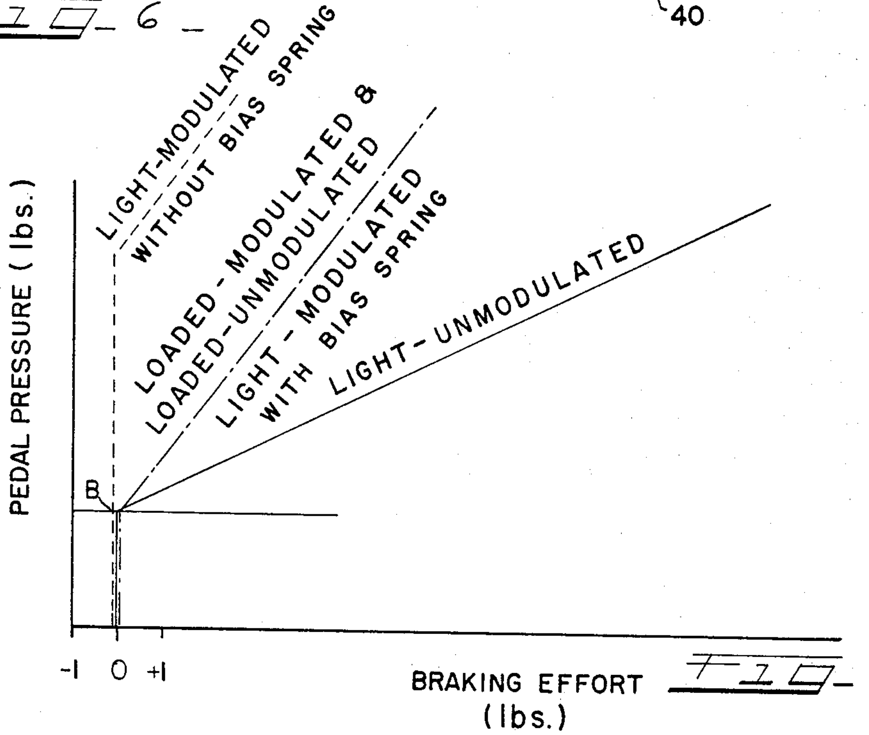
FIG. 7 is a diagram comparing the conventional system with the modulated or proportioning means employed in the invention.

Illustrative of this principle of modulating the effect of the brake pedal pressure under light loads to give the same "feel" as under heavy loads is shown diagrammatically in FIG. 7 where brake pedal pressure is plotted in pounds against the braking effort (brake chamber push rod force) in pounds showing the light loaded unmodulated condition; the modulated and the unmodulated heavy loaded condition and the light condition modulated with bias spring; and the light loaded modulated condition. It is seen at point B in the diagram that this is the pressure needed to overcome the springs in the brake chambers for both heavy and light loads that do not have a proportioning valve and therefore, are not modulated.

What is claimed is:

1. In a vehicle brake system for a vehicle, means for supplying a source of fluid under pressure including conduit means for supplying the fluid under pressure to the vehicle brake means, leveling valve means in fluid communication with the conduit means and positionable in accordance with vehicle load, flexible fluid storing means for varying fluid pressure in response to vehicle load having a first container communicating with the conduit means, and a second container in fluid communication with the leveling valve means, a first lever means operatively interposed between each container in supporting relation therewith and having an operative connection with the leveling valve means for moving the leveling valve means to supply fluid pressure to the second container or to exhaust fluid pressure therefrom to a source of low pressure, said first lever means being adapted intermediate its ends for pivotal attachment with the vehicle frame, a second lever means having an end connecting with each of the containers for operative movement of the first lever means and having another end adapted for connection with the vehicle axle and having its intermediate fulcrum portion adapted for pivotal connection with the vehicle frame, and further conduit means connecting with the second container and adapted for connection with the vehicle brake means for supplying a selective amount of fluid pressure to the brakes in accordance with the variations in the vehicle load.

2. The invention according to claim 1 and a dash pot means adapted for connection with the vehicle frame and the second lever means intermediate its pivotal fulcrum and its vehicle axle connecting end.

3. The invention according to claim 1 and a lost motion connection being provided in said second lever means between its intermediate fulcrum portion and its vehicle axle connecting end.

4. The invention according to claim 1 and each container comprising a flexible air bag.

5. The invention according to claim 1 and each flexible fluid container being coupled with the other and with each lever means.

6. The invention according to claim 1 and biasing means operatively connecting with each of the lever means.

7. The invention according to claim 1 and brake operating means operatively connecting with said first mentioned means and said further conduit means for controlling and varying the amount of said selective amount of fluid pressure to the vehicle brake means.

8. The invention according to claim 7 and said brake operating means comprising a control line and control valve therefor, and a relay valve in the control line and operatively connected with said further conduit means and sensitive in response to the operation of the control valve to limit the amount of fluid pressure to the vehicle brake means.

9. A vehicle brake system comprising means adapted for connection with a source of fluid under pressure, leveling valve means operatively connected with the means adapted for connection with the source of fluid under pressure, flexible bag means for proportionalizing fluid pressure to the vehicle brakes in fluid communication with said leveling valve means and the source of fluid, and first frame fulcrumed lever means operatively interposed between and connected with the leveling valve means and the flexible bag means, second frame fulcrumed lever means operatively interposed between and connected to the bag means and adapted for connection with the first lever means and the vehicle frame and with the vehicle axle, said bag means being provided with means for connecting with the vehicle brake means, said first and second lever means regulating the fluid pressure in the bag means in accordance with vehicle loading.

10. The invention according to claim 9 and said bag means comprising a pair of flexible bags one of which is in direct connection with the means adapted for connection with the source of fluid under pressure, the other of which is in communication with the leveling valve means and with the means for connecting with the vehicle brake means.

11. The invention according to claim 10 and said first lever means comprising a first lever provided with a fulcrum connection with the vehicle and having one end connected with the leveling valve means and the other end intermedially connected with each bag, and said second lever means having a second lever provided with a fulcrum connection for the vehicle and having one end connecting with the outer end of each bag and the other end having means for connecting with the vehicle axle.

12. The invention according to claim 11 and said second lever being provided with a lost motion connection between its fulcrum and its end adapted for connection with the vehicle axle.

13. The invention according to claim 11 and said second lever being provided with a dash pot means adapted for an operative connection between the vehicle body and the vehicle axle, whereby said vehicle body has a shock absorbing connection with respect to said vehicle axle.

14. The invention according to claim 9 and biasing means operatively connecting with the lever means.

15. The invention according to claim 9 and brake operating means operatively interposed between the source of fluid pressure and the brake means for varying the amount of pressurized fluid to the brake means.

16. A load responsive fluid pressure system comprising means for receiving a source of fluid under pressure, leveling valve means adapted to be mounted on a load bearing means and adapted for selective fluid communication with the means for receiving a source of fluid under pressure and a source of low pressure, proportionalizing means for selectively varying the amount of fluid pressure communicable with said means for receiving the source of fluid under pressure and with said leveling valve means and operated by said valve means to vary the pressure of the fluid exiting therefrom, load responsive lever means adapted to be mounted on the load bearing means and operatively connecting with the proportionalizing means and the leveling valve means, pressure responsive load reaction means being in operative fluid connection with the proportionalizing means and proportionally operated in accordance with the amount of fluid pressure received from the proportionalizing means, and lever actuating means operatively connected with the lever means and adapted for connection with the load bearing means whereby variations in the load of the load bearing means will vary the dimensional relation between the lever means and the lever actuating means to move the lever means and change the pressure in the proportionalizing means to the load reaction means.

17. The invention according to claim 16 and said lever means comprising a pair of levers being provided with means for connecting said levers to said load means, and said proportionalizing means comprising flexible bags connecting with each of said levers and interposed therebetween, and load connecting members for joining each of the levers with each of the flexible bags, and linkage means for connecting the lever means with the lever actuating means, said lever actuating means being load supporting whereby variations in the dimension relation between the lever actuating means and the load are operative to lower or raise the amount of fluid pressure transmitted by way of the leveling valve means and the bag means.

18. The invention according to claim 16 and brake operating means operatively interposed between the source of fluid pressure and the load reaction means for varying the amount of pressurized fluid to the load reaction means.

19. An air brake system for a vehicle for proportionalizing air pressure to the vehicle brake in accordance with vehicle load variation comprising a leveling means having alternate accesses for sources of high and low fluid pressures and a pair of flexible air bag means, one bag means having a fluid pressure outlet for the vehicle air brake means and communicating with the leveling means and the other bag having access for the source of high fluid pressure, a first lever connecting with the leveling valve means and between and with each air bag means, a second lever connecting outwardly with the outside of each of the air bag means and adapted for connection with the vehicle axle and with the vehicle as is the first lever connected with the vehicle, said second lever being provided with biasing means connecting with the first lever to effect the amount of fluid pressure exiting from the outlet of said one air bag means.

20. A fluid pressure proportionalizing valve means for a vehicle brake system comprising a pair of flexible fluid bags, a load responsive valve means in fluid communication with one flexible fluid bag, the one fluid bag having fluid pressure exit means for the vehicle brakes, said leveling valve means being adapted for communication with a source of fluid pressure and the other air bag being adapted for comunication with said source of fluid pressure, a first lever connecting with the leveling valve means and between and with both air bags, a second lever connecting with the outer ends of the air bag means and adapted for connection with the vehicle axle, each of said levers being adapted to be pivoted in response to changes in the vehicle load and vary the effective diameter of one bag relative to the other, whereby fluid pressure delivered to the leveling valve and to the first air bag means is changed in accordance with the variation in the vehicle load and whereby the second bag is contracted when the first bag is extended in response to changes in vehicle load to vary the air pressure supplied to the vehicle brakes.

21. The invention according to claim 20 and brake operating means operatively interposed between the source of fluid pressure and the fluid pressure exit means for varying the amount of pressurized fluid to the fluid pressure exit means.

22. A vehicle braking system comprising a leveling valve having access for a source of fluid pressure and fluid bleed means and adapted for connection with the vehicle body, a pair of interconnected flexible air bags, a first lever adapted to be fulcrumed on the vehicle and connecting with the leveling valve and with each air bag and intermediate each air bag, a second lever adapted to be fulcrumed on the vehicle and operatively connecting with the outer portion of each air bag to cooperate with the first lever in response to vehicle load variance to vary the effective diameter of the bags and adapted to connect with the vehicle load supporting means, said leveling valve means having communication with one air bag having a fluid pressure exit and the other air bag having an access to the source of fluid pressure, the fluid pressure through the exit varying in accordance with load variance.

23. The invention according to claim 22 and biasing means between each lever.

24. The invention according to claim 22 and said second lever having a lost motion connection adapted to provide for lost motion between the air bags and the vehicle axle.

25. The invention according to claim 22 and said second lever being provided with a shock absorbing means being adapted to be disposed in a vertical position between and connected with the vehicle body and the second lever for absorbing shock loads.

26. In a system for modulating the pressure of a fluid in accordance with variations in load, a fluid pressure metering valve means and bleed means therefor, pneumatic containing means comprising a first flexible bag means for receiving a fluid under pressure, a second flexible bag means in pressurized fluid communication with said metering valve means for modulating the pressure of the fluid therethrough, lever means operatively connecting with each bag means and the metering valve means and comprising a first lever operatively connected with the metering valve means for operation thereof and operatively connected with each bag and operated thereby, a second lever operatively connected with each bag means for varying effective diameter of one bag relative to the other and operative on said first lever, and means sensing variation in load operatively connected with said second lever and operative thereupon to operate said first lever and thereby to move said metering valve means from an equilibrium position to another position for selectively supplying and exhausting fluid under pressure to and from said second bag and varying the pressure thereof for operating said first lever to return metering valve means to the equilibrium position.

27. The invention according to claim 26 and biasing means operatively connected with each lever to limit the attenuating of the pressure of the fluid to a predetermined value.

28. The invention according to claim 26 and said first lever being connected in between each bag means and said bag means being between and connected with said second lever.

29. In a brake system for a ground vehicle means for attenuating or de-amplifying the fluid pressure signal initiated by the operator and transmitted through conduit to a relay valve to actuate the brakes, first and second opposed flexible fluid chambers having side walls and a common interface, each chamber having an effective area varying with the curvature of its side walls, a leveling valve connecting with the interface, the common interface of the two fluid chambers being maintained in position relative to the vehicle frame by means of the leveling valve, a movable lever means and load responsive mechanical linkage therefor, said chambers having outer end-faces being confined by the movable lever means, whose position is controlled by the mechanical linkage which reflects the load on the vehicle by reacting to changes in position of the vehicle frame relative to the vehicle ground engaging means, a relay valve connecting with the second chamber, said fluid pressure signal initiated by the operator being applied to one of the two flexible fluid chambers directly, and to the second fluid chamber through the leveling valve, such that the pressure in the second flexible fluid chamber, which is transmitted on to the relay valve to actuate the brakes, is a proportion of the pressure in the first flexible fluid chamber, such proportion being inversely proportioned to the effective area of the chambers, and said effective area being determined by the curvature of the side walls of the chambers, and said curvature being determined by the position of the movable lever means relative to the inter-face between the chambers.

References Cited

UNITED STATES PATENTS

| | | | |
|---|---|---|---|
| 3,043,633 | 7/1962 | Hübscher | 303—22 |
| 3,159,433 | 12/1964 | Chevreux | 303—22 |

MILTON BUCHLER, *Primary Examiner.*

J. J. McLAUGHLIN, *Assistant Examiner.*